324-77

SEARCH ROOM

Feb. 28, 1961 H. HURVITZ 2,973,478

FREQUENCY SCANNING SPECTRUM ANALYZERS

Filed March 29, 1957

HYMAN HURVITZ
*INVENTOR*

Hurvitz & Rose 2,973,478
Patented Feb. 28, 1961

2,973,478

FREQUENCY SCANNING SPECTRUM ANALYZERS

Hyman Hurvitz, 1313 Juniper St. NW., Washington, D.C.

Filed Mar. 29, 1957, Ser. No. 649,455
23 Claims. (Cl. 324—77)

The present invention relates generally to frequency scanning spectrum analyzers, and more particularly to frequency scanning spectrum analyzers having accelerated scan rates.

The conventional spectrum analyzer includes a superheterodyne receiver in which the local oscillator is scanned over a frequency band, frequency resolution being provided by an I.F. amplifier. In such devices the rate of scan in c.p.s. per second is related to the I.F. bandwidth by the relation (1)

$$\text{B.W.}=1.5\sqrt{\frac{df}{dt}}$$

where B.W. is I.F. bandwidth in c.p.s., and $$\frac{df}{dt}$$

is the scanning rate of the local oscillator in c.p.s. per second. Low resolution systems require, therefore, a slow scan, and wide band low resolution systems require a long time to scan. If, for example, a 20,000 c.p.s. band were to be scanned, and 10 c.p.s. resolved, $$\frac{df}{dt}$$

would be approximately 50 c.p.s. per second, and 400 second would be required to scan through the band.

It is an object of the present invention to provide a scanning spectrum analyzer employing a superheterodyne circuit, but having a far greater possible scan rate than is indicated by the relation $$\text{B.W.}=1.5\sqrt{\frac{df}{dt}}$$

The above and still further objects, features and advantages of the present invention will become apparent upon consideration of the following detailed description of one specific embodiment thereof, especially when taken in conjunction with the accompanying drawings, wherein.

Figures 1, 2, 3:
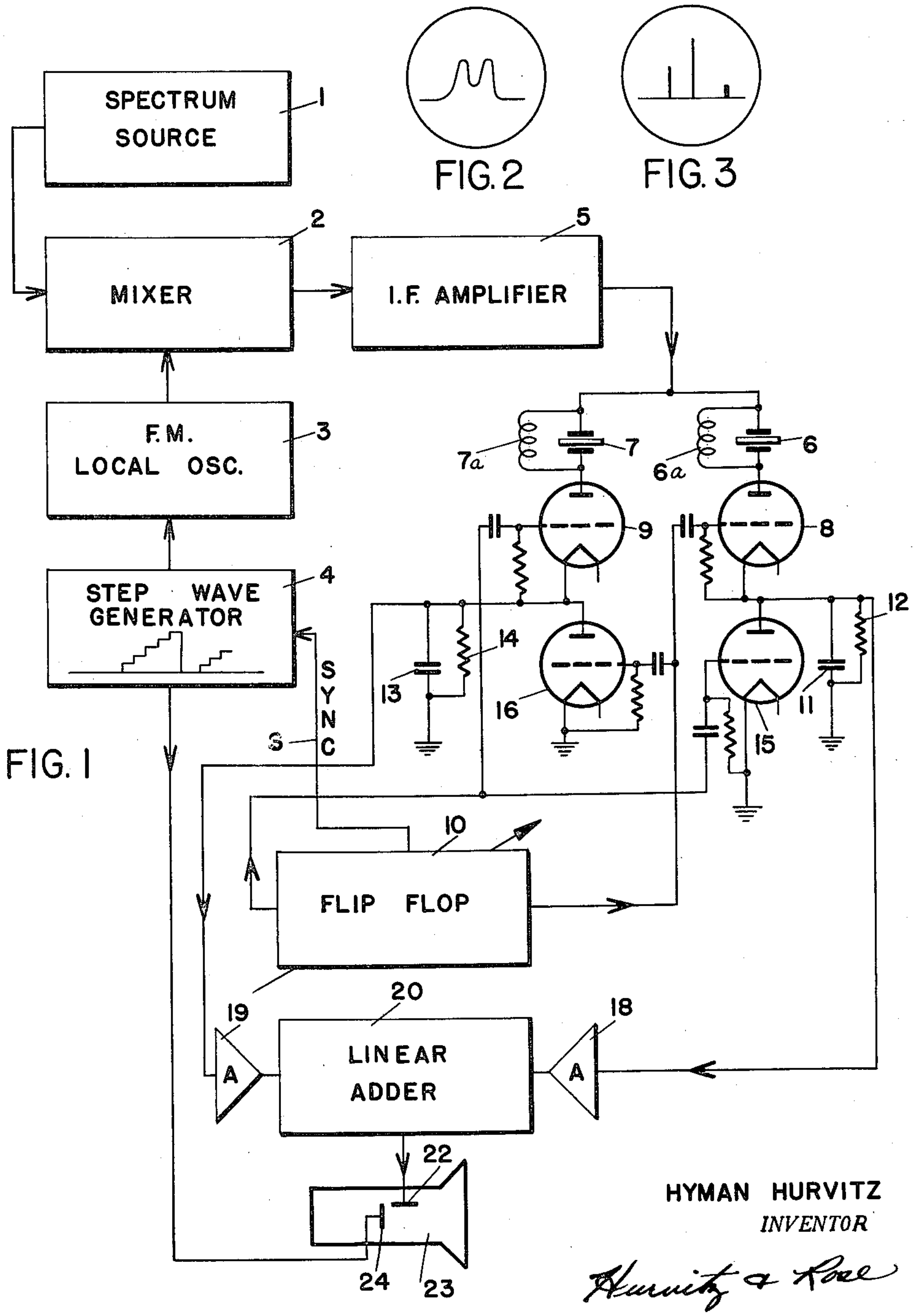
Figure 1 is a circuit diagram of an illustrative example of the invention, partly schematic and partly in block.
Figure 2 is a representative of the face of a cathode ray tube, of a conventional scanning spectrum analyzer.
Figure 3 is a representation of the face of a CRT, according to the present invention.

Referring now to the accompanying drawings, the reference numeral 1 denotes a source of signal which is to be analyzed for Fourier power components. The signal is applied to a mixer 2 to which is also applied the output of a frequency modulated local oscillator 3, the frequency of which is responsive to the scanning voltage provided by a step-wave generator 4. The conversion products are supplied to a preliminary I.F. amplifier, which is designed to have a wide pass band, to permit a very rapid scan, and a high gain to provide a large voltage at its output. The pass band may be that indicated by the relation (1), for example, for a high value of $$\frac{df}{dt}$$

In cascade with the I.F. amplifier 5 is connected two parallel filters, 6 and 7. The latter are illustrated as piezo-crystals, but may be of other types. Filters 6 and 7 are narrow band filters designed to pass bands requisite to provide the ultimately desired resolution of the system, and moreover are duplicates. Inductances *6a* and *7a* tune out the inherent shunt capacities of the filters 6 and 7. The pass bands of these filters may be selected to be very narrow without regard for the relation (1).

In series with filter 6 is a gating device 8, indicated as a triode. In series with filter 7 is a similar gating device 9. The triodes 8 and 9 are normally biased to cut-off and are gated on or open in alternation for equal times by a multivibrator or flip-flop 10, which is free running. When either gating device is open its associated filter passes current through the gating device, and at such time the filter is high Q, since it is in series with a relatively resistance. The triode 8, for example, acts as a detector, and rectifies the output of the filter 6. The triode 8 has a cathode circuit which integrates, and specifically a condenser 11 with a parallel high resistance 12, to provide a path to ground for the cathode. Similarly, triode 9 has a cathode circuit consisting of condenser 13 and resistance 14, identical with condenser 11 and resistance 12, respectively.

A discharge triode 15 is connected across condenser 11, and a discharge triode 16 is connected across condenser 13. These triodes are normally blocked, and can be unblocked in response to the multivibrator or flip-flop 10. The interconnections are such that triodes 9 and 15 block and unblock together, and that triodes 8 and 16 block and unblock together.

The voltages across the condensers 11 and 13 are applied via video amplifiers 18 and 19 to a linear mixer 20, the output of which is connected to the vertical deflection electrode 22 of a cathode ray tube indicator 23. The horizontal deflection electrode 24 is connected to step wave generator 4. The latter may be driven from the flip-flop 10 via lead S so that successive steps will occur with each transfer of the flip-flop from one state to another. The horizontal deflection of the beam of CRT 23 is accordingly step-wise, and in synchronism with successive sampling operations by triodes 8 and 9.

*Operation*

Assuming initially that triode 8 to be open, triode 9 is blocked. In such case filter 8 passes signal to condenser 11, but rectification takes place in triode 8. It follows that condenser 11 will acquire an increment of charge for each cycle passed by filter 6, and that while the amplitudes of successive increments will increase exponentially, any given one (say the 10th or 20th) will have an amplitude determined by the amplitude of the signal supplied by I.F. amplifier 5 to filter 6. Assume that flip-flop 10 is so timed that it permits 100 cycles to pass before cutting triode 8 off. In such case, condenser 11 will acquire a total charge, or voltage, proportional to the amplitude of signal applied by I.F. amplifier 5. This voltage is applied via amplifier 18 and mixer 20 to vertical deflection electrode 22, and effects a vertical deflection of the beam of CRT 23.

The flip-flop 10 now reverses, cutting off triode 8, and hence terminating charging of condenser 11, and rendering triode 15 conductive. The charge or condenser 11 now decays rapidly to zero.

Simultaneously, a stepping pulse is applied to step-wave generator 4, which adds a step or increment to its output wave, shifting the frequency increment applied to filters 6, 7. Triode 9 is made conductive, and the new frequency increment charges condenser 13 via triode 9, for 100 cycles of I.F. signal. The condenser 13 acquires a charge, or voltage, proportional to the amplitude of the new applied I.F. signal, and transfers this voltage to vertical deflection electrode 22.

Thereafter triodes 8 and 16 are again made conductive by flip-flop 14. Triode 16 discharges condenser 13 rapidly and triode 8 permits condenser 11 to recharge. However, the step-wave generator 4 has been caused to increase its amplitude when the flip-flop 10 reversed, so that condenser 11 now samples still a further new increment of frequency, deriving from spectrum 1.

In essence, condensers 11 and 13 sample adjacent frequency increments in alternation, each being discharged while the other is sampling, preparatory to its own sampling operation. The sampling operation is short, involving relatively few cycles of signal. The filters must also discharge, but their decay time when blocked is about equal to their rise time when passing signal.

If we assume that a band 20,000 cycles wide is to be analyzed, with a resolution of 10 c.p.s., filters 6 and 7 must be 10 c.p.s. wide, when passing current. There is involved 2,000 sampling operations, 1,000 by each of filters 6 and 7. If the 20,000 cycle band extended from 100 to 120 kc., it could be assumed that each sampling operation included the same number of cycles, approximately. If each sampling operation encompassed 100 cycles, it could require about 1/1,000 second at 100 kc. Hence, a scan could be completed in about two seconds. This contrasts sharply with the initially calculated value of 400 seconds.

Furthermore, the fact that the beam of CRT 23 is stationary during each sample provides a clear presentation, each frequency having a single location on the horizontal axis, as in Figure 3. The type of display produced by the conventional system with sawtooth scan, is that exemplified in Figure 2. Here the peaks represent signals, and the precise reading of frequencies is thereby made difficult.

It will be clear that, if desired, the scanning generator 4 may be of sawtooth type, and unsynchronized with flip-flop 10. Further, one of filters 8, 9, and associated gating devices and condensers, may be omitted. Such omission will leave an operative system, but will detract radically from the results obtainable with the system as illustrated and described.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A spectrum analyzer comprising, a single frequency converter for a band of frequencies, a source of control signal of variable level, said single frequency converter including a local oscillator and a single electronic tuner responsive to control signal level to control the frequency of said single local oscillator, a plurality of substantially identical I.F. filters of substantially identical pass bands frequencies, means for rendering said I.F. filters responsive in alternation to said single frequency converter one at a time for substantially equal time periods, and means for varying said control signal level by quantized amounts at the beginning of each of said time periods.

2. The combination according to claim 1, wherein is provided a visual indicator having means for generating a mark deflecting in two coordinate directions, and means for moving said mark in one of said coordinate directions at the beginning of each of said time periods.

3. The combination in accordance with claim 2, wherein each of said filters has a time constant considerably longer than one of said time periods.

4. The combination according to claim 3, wherein is provided means for displaying the values of said voltages as displacements of a mark from a base line and the values of the associated frequencies as single points of said base line.

5. A system for measuring frequencies arranged at random in an ordered array of immediately adjacent possible frequencies comprising two resonant storage circuits having the same pass band frequencies, means for transiently storing signals from successive positions immediately adjacent in said ordered array in alternate ones of said two resonant storage circuits in time sequence, and means for discharging a stored signal from either storage circuit on commencing storage of a signal in the other storage circuit.

6. In combination, a source of signal of predetermined amplitude and frequency, two filters each tuned to pass said frequency and having time constants such as to permit attainment of substantially maximum response at a predetermined time following application of said frequency to said filters, a first rectifying gate, a first storage condenser, a second rectifying gate, a second storage condenser, means connecting said first rectifying gate and said first storage condenser in series with one of said filters, means connecting said second storage condenser and said second rectifying gate in series with the other filter, and means for gating on said gates in alternation at a rate faster than permits said filters to attain maximum response to said frequency.

7. The combination according to claim 6, wherein is provided means for discharging each of said condensers rapidly in the intervals between charging thereof, whereby said condensers are each charged and discharged in succession, and are both charged in alternation and discharged in alternation.

8. In a scanning spectrum analyzer, the combination of a frequency scanning superheterodyne receiver having a single scanning device, said receiver including two substantially identical intermediate frequency filters in parallel connected in cascade with said single scanning device, means for effecting scanning of said scanning device at a rate in cycles per second far greater than an optimum rate, having regard for the band pass of said filters, a display device and means for gating signals from said filters in alternation to said display device at a rate far above that which permits said filters to respond totally to impressed signals.

9. In a spectrum analyzer, a source of a frequency band, a single mixer, a single local oscillator, means for connecting said frequency band and said single local oscillator to said single mixer in heterodyning relation, two substantially identical intermediate frequency filters coupled in cascade to said mixer and in parallel with each other for selecting heterodyned frequencies, means for varying the frequency of said local oscillator periodically over a range of values at an average rate in cycles per second per second which is substantially greater than required to permit said filters to respond fully to a frequency in said band, means rendering said filters responsive to said mixer in alternation each for a time interval inadequate to permit said filters to build up a response approximating maximum, a visual indicator, and means for displaying on said visual indicator the amplitudes of response of said filters against a base line generated in substantial synchronism with variation of local oscillator frequency.

10. In a spectrum analyzer for analyzing a frequency band, a first band pass filter, a second band pass filter, said filters having substantially identical band pass characteristics, means for passing through said filters in alternation immediately adjacent successive portions of said frequency band for time intervals smaller than required for said filters to attain maximum response to impressed signal, and means for displaying the responses of said filters to said portions of said frequency band.

11. In a system for displaying the frequency content of a band of frequencies provided by a source of said band of frequencies, a heterodyne mixer coupled to said source, a local oscillator coupled to said mixer, means for scanning the frequency of said local oscillator over a range substantially equal to the width of said band of frequencies, an intermediate frequency filter coupled to said mixer, said filter including two parallel substantially identical frequency selective channels, said means for scanning having a rate of scan of $$\frac{df}{dt}$$

cycles per second per second, each of said frequency selective channels having a pass band less than $$\sqrt{\frac{df}{dt}}$$

cycles per second, means for rendering said cdannels operative to pass signal in alternation at a rate such that each of said filters respond at less than maximum response, because of the pass band thereof, and means for visually displaying the joint responses of said channels as a function of the frequencies of said local oscillator.

12. In a receiver arranged for scanning over a relatively wide band of frequencies, a first filter, a second filter, said first and second filters being substantially identical, means for applying said band of frequencies jointly to said filters in parallel, and means for disabling said first and second filters periodically and in alternation, said first and second filters being normally operative to pass signal, and the times during which said filters are operative to pass signal being substantially equal for said first and second filters and less than is required for said filters to attain substantially full response to a suddenly applied signal.

13. In a system for visually plotting amplitude versus frequency signals contained in a relatively wide band of frequencies, a mixer to which said band of frequencies is applied, a local oscillator coupled to said mixer, means for sweeping said local oscillator over a band of frequencies equal in width to said first-mentioned band of frequencies, and an intermediate frequency amplifier coupled to said mixer and designed to derive heterodyne products from said mixer, said intermediate frequency amplifier comprising two parallel selective normally active channels of substantially identical pass characteristics, means for disabling said channels in alternation, and means for displaying the responses of said channels on a common display device as a function of frequency of said local oscillator.

14. The combination according to claim 13, wherein the active period and the period of disablement of each of said channels are substantially equal.

15. The combination according to claim 13, wherein the active period of each of said channels is approximately the time required for that channel to attain full response to a suddenly applied signal.

16. The combination according to claim 13, wherein the open period of each of said channels is appreciably less than the time required for that channel to attain full response to a suddenly applied signal.

17. The combination according to claim 13, wherein the active period of each of said channels is radically less than the time required for that channel to attain full response to a suddenly applied signal.

18. In a system for visually plotting amplitude versus frequency for a relatively wide band of frequencies, a heterodyne mixer to which said band of frequencies is applied, a local oscillator coupled to said mixer, means for sweeping said local oscillator over a range of frequencies, an intermediate frequency amplifier coupled to said mixer and adapted to derive heterodyne products from said mixer, said intermediate frequency amplifier including plural substantially identical parallel normally disabled selective channels and means for enabling said channels in a time sequence such that each of said channels shall have a time period of enablement while the remainder of said channels are disabled and means for displaying the responses of said channels on a common display device as a function of frequency of said local oscillator.

19. In a spectrum analyzer, a first filter having a predetermined center frequency and a predetermined pass band, a second filter having said predetermined center frequency and said predetermined pass band, each of said filters including an input circuit and an output circuit, a source of signal, means for applying said signal to said input circuits in parallel, means for sweeping the frequency of said signal across the pass bands of said first and second filters simultaneously, means for gating said first filter on and off in alternation, means for gating said second filter off and on in alternation, said last two means being arranged and adapted to effect gating on of said first filter while said second filter is off, and to effect gating on of said second filter while said first filter is off.

20. The combination according to claim 19 wherein the rate of frequency sweep of said signal is $$\frac{df}{dt}$$

cycles per second per second and the pass band of said filters is less than $$.5\sqrt{\frac{df}{dt}}$$

21. The combination according to claim 19 wherein the rate of frequency sweep of said signal is $$\frac{df}{dt}$$

in cycles per second per second, and the pass band of said filters is less than $$.05\sqrt{\frac{df}{dt}}$$

22. The combination according to claim 19 wherein is further provided means for separately detecting and storing response signals proportional to the maximum responses of each of said filters to said signal while each of said filters is gated on and for rapidly discharging the stored response signals while each of said filters is gated off.

23. In a spectrum analyzer, a first filter having a predetermined center frequency and a predetermined time constant, a second filter having substantially said center frequency and substantially said time constant, a source of signal having a frequency, means for sweeping said frequency across the pass band of said filters in a time shorter than said time constant, and means for gating said first filter on and said second filter off, and thereafter said first filter off and said second filter on, at least once, during said time shorter than said time constant.

References Cited in the file of this patent

UNITED STATES PATENTS

| | | |
|---|---|---|
| 1,830,242 | Ranger | Nov. 3, 1931 |
| 2,159,790 | Freystedt | May 23, 1939 |
| 2,211,352 | Simpson et al. | Aug. 13, 1940 |
| 2,484,618 | Fisher | Oct. 11, 1949 |
| 2,530,693 | Green | Nov. 21, 1950 |
| 2,630,528 | Kamphoefner | Mar. 3, 1953 |
| 2,661,419 | Tongue | Dec. 1, 1953 |
| 2,676,206 | Bennett | Apr. 20, 1954 |
| 2,705,742 | Miller | Apr. 5, 1955 |

FOREIGN PATENTS

| | | |
|---|---|---|
| 950,760 | France | Mar. 28, 1949 |